(12) United States Patent
Lee et al.

(10) Patent No.: US 9,844,738 B1
(45) Date of Patent: Dec. 19, 2017

(54) TRAY ASSEMBLY FOR GAS/LIQUID CONTACT TOWER

(71) Applicants: Adam T. Lee, Dallas, TX (US); Pai-Yu Polly Chiang, Dallas, TX (US); Xie Runxing, Beijing (CN); Wang Changzhi, Beijing (CN)

(72) Inventors: Adam T. Lee, Dallas, TX (US); Pai-Yu Polly Chiang, Dallas, TX (US); Xie Runxing, Beijing (CN); Wang Changzhi, Beijing (CN)

(73) Assignee: AMT International Inc., Plano, TX (US)

( * ) Notice: Subject to any disclaimer, the term of this patent is extended or adjusted under 35 U.S.C. 154(b) by 0 days.

(21) Appl. No.: 14/999,714

(22) Filed: Jun. 20, 2016

(51) Int. Cl.
*B01F 3/04* (2006.01)
*B01D 3/32* (2006.01)

(52) U.S. Cl.
CPC .......... *B01D 3/324* (2013.01); *B01F 3/04078* (2013.01); *B01F 3/04446* (2013.01); *B01F 3/04468* (2013.01); *B01F 3/04482* (2013.01); *B01F 3/04496* (2013.01); *B01F 3/04751* (2013.01); *B01D 2202/00* (2013.01)

(58) Field of Classification Search
CPC .... B01F 3/04; B01F 3/04007; B01F 3/04078; B01F 3/04468; B01F 3/04496; B01F 3/04482
USPC ............................................ 261/114.1, 114.5
See application file for complete search history.

(56) References Cited

U.S. PATENT DOCUMENTS 5,454,989 A * 10/1995 Nutter .................... B01D 3/324
261/114.1
6,817,596 B2 * 11/2004 Fischer ................... B01D 3/22
261/114.1

* cited by examiner

*Primary Examiner* — Robert A Hopkins
(74) *Attorney, Agent, or Firm* — George A. Seaby

(57) ABSTRACT

A tray assembly for improved gas/liquid contact in a chemical process tower includes a tray deck and a downcomer. A mixer is provided in the top of the downcomer and a distributor is attached to a floor of the downcomer. The mixer includes at least one mixing baffle parallel to an outlet weir on the tray. The distributor includes a plurality of spaced apart flow directing plates extending downwardly toward and spaced apart from the floor of the downcomer. In combination, the mixer and distributor effect even liquid flow across the surface of a subjacent tray deck.

6 Claims, 4 Drawing Sheets

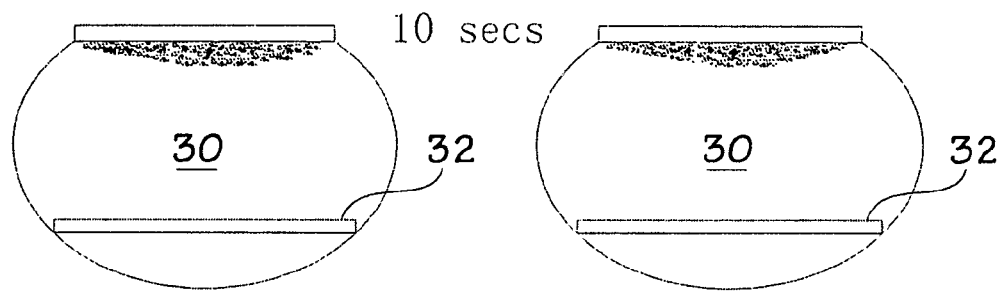
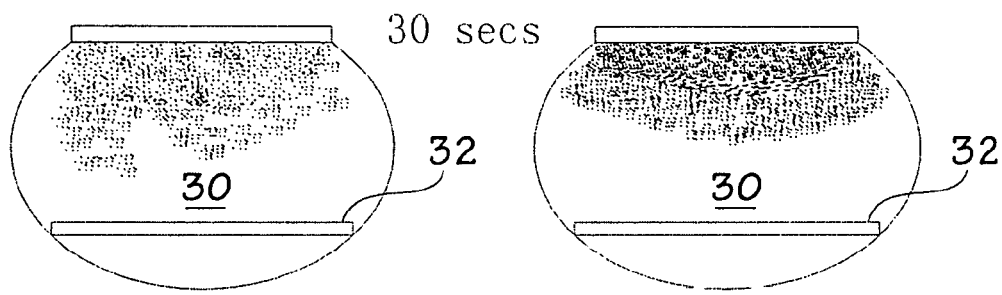
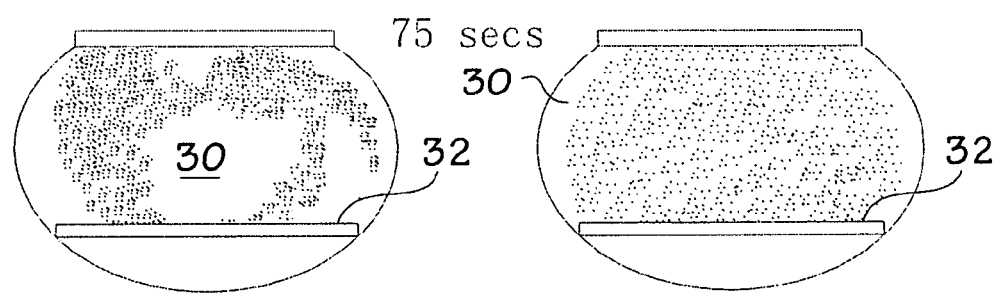
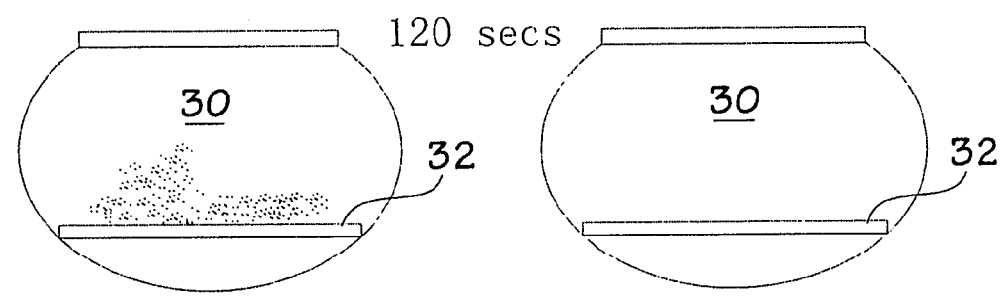
FIG. 7A   FIG. 7B

TRAY ASSEMBLY FOR GAS/LIQUID CONTACT TOWER

FIELD OF THE INVENTION

The present invention relates to a tray assembly for gas/liquid contact in a chemical process tower.

BACKGROUND OF THE INVENTION

Several tray designs are known for gas-liquid contactors used in chemical processes including reactions and separations. In each design, trays are situated within the towers for contact between the gas and liquid within the towers. Trays for large diameter towers are prone to liquid flow maldistribution on the trays as described, for example, by M. J. Lockett in "Distillation Tray Fundamentals" (1986). It is also known that liquid flow maldistribution on a tray affects tray efficiency—see Wijn, E. F. in "The effect of downcomer layout pattern on tray efficiency" published in The Chemical Engineering Journal, vol. 63, pages 167-180 (1996).

Several tray designs intended for correcting liquid flow maldistribution have been invented, of which the following are representative examples: U.S. Pat. No. 3,729,179 (1973) issued to Keller; U.S. Pat. No. 3,747,905 (1973) issued to Nutter et al.; U.S. Pat. No. 5,269,976 (1993) issued to Biddulph et al; U.S. Pat. No. 5,453,222 (1995) issued to Lee et al; U.S. Pat. No. 6,371,455 (2002) issued to Lee et al; U.S. Pat. No. 6,817,596 (2004) issued to Fischer; and U.S. Pat. No. 8,070,142 (2011) issued to Lee et al.

The above listed patents disclose various downcomer designs that allow the liquid to leave the downcomer and flow across an immediately subjacent tray in a more uniform pattern. However, because tray decks are not rectangular, some degree of maldistribution develops when the liquid travels some distance across a tray to an outlet downcomer. Unexpectedly, it was discovered that liquid entering the downcomer does not undergo lateral mixing because there is no hydraulic gradient. In a multiple tray tower, the lack of downcomer mixing can develop a concentration gradient which propagates down the tower. All prior art patents disclose downcomer distributor designs that aim at distributing liquid at the entrance of the tray to improve liquid distribution across the tray, but none include means at the top of the downcomer for ensuring that the liquid entering the downcomer has a uniform composition.

In spite of previous efforts, there still exists a need to address the maldistribution issue. The present invention addresses the maldistribution issue by providing a downcomer, which incorporates both a novel liquid mixer with a novel liquid distributor.

SUMMARY OF THE INVENTION

The tray assembly of the present invention includes an improved tray design for use in a chemical process tower. The tray assembly includes a downcomer having a mixer its inlet and a distributor in its outlet.

In combination, the mixer and distributor effect relatively even liquid flow across the surface of a tray immediately below the downcomer, thereby avoiding the formation of stagnant regions. The net result is that there is higher tray capacity and efficiency when compared to prior art tray assemblies.

It has been discovered that liquid mixing in the downcomer enhances and optimizes mass transfer efficiency. This is achieved by providing a mixer in the downcomer inlet comprising at least one vertical baffle located centrally in the downcomer and spaced apart from a downcomer floor. Preferably, the baffle is substantially parallel to and downstream of a downcomer inlet weir in the direction of fluid flow.

In one embodiment, the mixer is in the form of a plurality of spaced apart, vertically extending, corrugated plates having ridges and grooves for directing flow outwardly toward the perimeter of the tower wall.

The distributor is in the form of a plurality of spaced apart flow directing plates disposed at various angles to the vertical and spaced from a tray deck immediately below, for directing fluid flow substantially evenly across a fluid receiving/distribution area of the tray below.

BRIEF DESCRIPTION OF THE DRAWINGS

FIGS. 7A and 7B illustrate time lapse sequences of comparative liquid flow tests over tray decks, wherein FIG. 7A shows results for a prior art system and FIG. 7B shows results for a tray assembly according to the invention.

DETAILED DESCRIPTION OF THE INVENTION

A tray assembly used for gas-liquid contact for use in a distillation tower is described below. The assembly includes a tray with a downcomer at one end thereof. The downcomer contains a mixer and a distributor suspended below a perforated floor by conventional means such as bolting or welding. The mixer is located in the inlet opening of the downcomer. The mixer includes at least one corrugated mixing baffle. The number of baffles depends upon the dimensions of the downcomer and operating conditions. Where two or more baffles are provided, they are spaced from one another and arranged substantially parallel to an outlet weir. The baffles are mounted vertically and extend downwardly toward a perforated bottom floor of the downcomer and are spaced therefrom.

The distributor includes a plurality of plates spaced apart from one another and attached to the bottom of the perforated downcomer floor by conventional means, e.g. a bracket. The plates are spaced from a tray assembly immediately below. The purpose of the distributor plates is to divide and direct fluid flow substantially evenly across a receiving, bubbling/froth initiating area of a subjacent tray and to and guide the froth thus formed in a divergent flow pattern across the subjacent tray while achieving approximately the same liquid residence time perpendicular to the bulk flow direction on the tray.

The combination of mixer and distributor provides more uniform liquid concentration in the downcomer and more even liquid flow across the tray immediately below the downcomer. The integrated design of mixer and distributor reduces maldistribution of liquid flow and liquid concentration present in other designs, which in turn improves the efficiency of gas-liquid contact on the tray.

Figure 1:
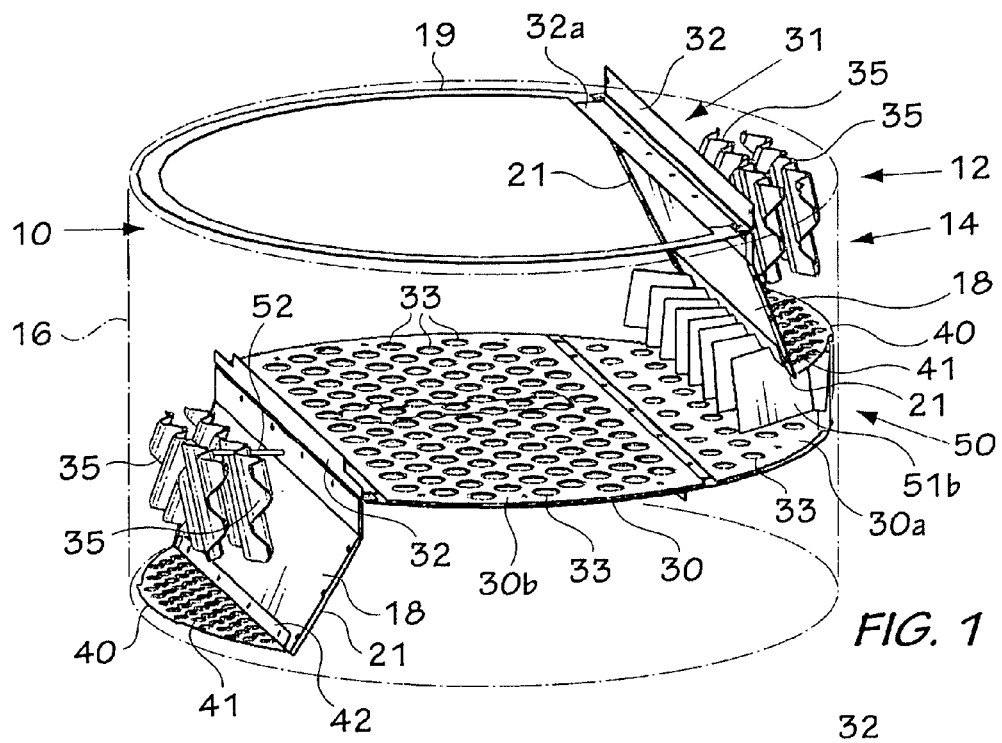
FIG. 1 is an isometric view of one embodiment of a tray assembly in accordance with the present invention.

With reference to FIG. 1, a tray assembly, which is indicated generally at 10, is installed in a cylindrical chemical process tower indicated generally at 12. The tray assembly 10 is affixed to the inside of the tower wall 16 by a C-shaped frame assembly 19. The tray assembly includes a deck 30 containing perforations 33. The tray deck 30 can be made of one or several sections, and at least one downcomer indicated generally at 14 is located at an outlet edge of the deck 30 for transporting liquid-vapor mixtures between adjacent tray decks 30. The downcomer 14 is defined by the tower wall 16, an inclined inner wall 18, a top inlet opening 31, and a floor 40 containing perforations 41 defining an outlet from the downcomer. The inclined wall 18 tapers downwardly. The side edges of the inclined wall 18 are attached to the tower wall 16 by fluid-tight seals 21. The horizontal downcomer floor 40 is attached to the inclined wall 18 by a plate 42 and rivets. The outer edge of the floor 40 is also attached to the tower wall 16 by a fluid-tight seal. The downcomers of adjacent trays are arranged in the tower diametrically opposite to one another.

The deck 30 is circular with a segment removed from one side thereof, the resulting opening 31 defining the inlet to the downcomer 14. A vertical outlet weir 32 at the inlet opening 31 maintains a depth of a liquid-vapor mixture on the tray deck 30 and introduces the liquid-vapor mixture into the downcomer 14. The weir 32 extends across the downcomer inlet opening 31 and is attached at its ends in fluid-tight manner to the support 19 and the tower wall 16 by a horizontal strip 32a A plurality of vertically spaced apart decks 30 are situated in the tower 12. The decks 30 are oriented so that the downcomer 14 of one tray 10 is located above an inlet distribution/receiving area 30a of a deck immediately below.

The tray deck of FIG. 1 includes an inlet panel section or area 30a having perforations 33 for initiating bubbles/froth formation and a downstream panel section 30b with perforations 33. The deck 30 extends from the inlet distribution area 30a to the downcomer inlet opening 31. Froth initiation in the area 30a may be effected by various conventional means such as by upwardly extending flanges (not shown) around the perforations 33. It will be appreciated that the tray assembly 10 may include a plurality of downcomers 14.

The downcomer 14 is adjacent the inner surface of the wall 16 of the tower 12, and is bounded on one side by a portion of the inner surface of the wall 16, and by the inclined wall 18. The wall 18 extends downward across the length of an edge of the deck 30 toward the inlet area 30a of an immediately subjacent deck 30. There is a gap between the bottom edge of the downcomer wall 18 and the subjacent tray deck 30, the gap extending along all or the majority of the width of the downcomer wall 18.

Figure 3:
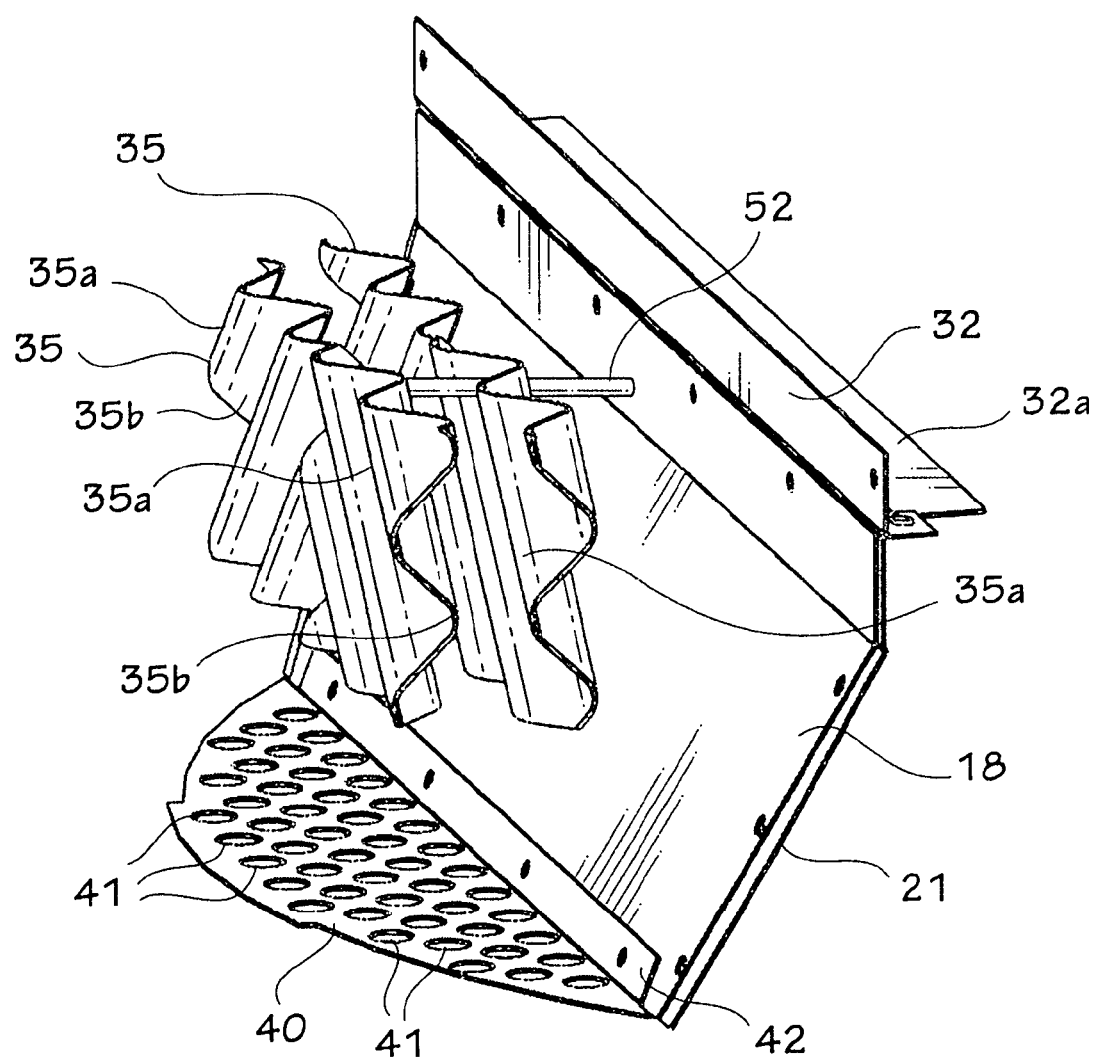
FIG. 3 is an isometric view on one end of the tray assembly showing details of a mixer.

As best shown in FIG. 3, the weir 32 is attached to the top of the wall 18 by a horizontal plate 32a and rivets. The inclined wall 18 includes a bracket 41 for attaching the floor 40 to the bottom edge of the wall 18 using rivets. Other securing means such as welding can be used to interconnect elements of the assembly.

Figure 2:
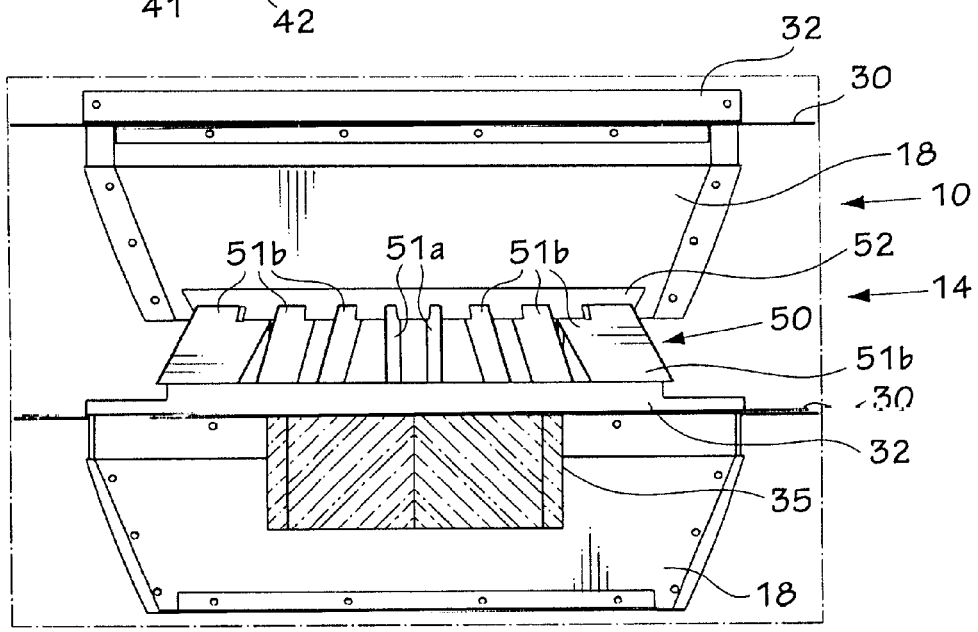
FIG. 2 is an end view of the tray assembly of FIG. 1.

A mixer is mounted in the top end of the downcomer 14. The mixer is defined by two spaced apart, corrugated mixing plates 35 located centrally in the top of the downcomer substantially parallel to the outlet weir 32 and to each other. The plates 35 are suspended from a pin 39 attached to the inner downcomer wall 18. As best shown in FIG. 3, the corrugated plates 35 include alternating ridges 35a and grooves 35b for directing fluid flow within the downcomer 34. As shown in FIG. 2, on one side of the vertical center, the ridges 35a and grooves 35b are inclined outwardly away from the center, and on the other side of center the ridges and grooves are inclined outwardly in the opposite direction. The plates 35 extend vertically downwardly to about one half the height of the downcomer 14, and direct liquid flow towards the outside of the downcomer walls. The mixing plates 35 are located centrally in the top portion of the downcomer 14 and occupy approximately 70% of the top portion of the downcomer, the remaining 30% of the top portion being open. Preferably the ridges 35a and grooves 35b are inclined by 45° to provide mixing in both x and y directions, i.e., both vertically and horizontally. Since the plates 35 extend approximately half way down the downcomer, most of the fluid directed to the perimeter area will flow back to the central area below the plates, creating a mixing effect without pressure drop. Therefore, the capacity of the downcomer is not impeded by the mixer plates. The plates can be solid or perforated.

Figure 4:
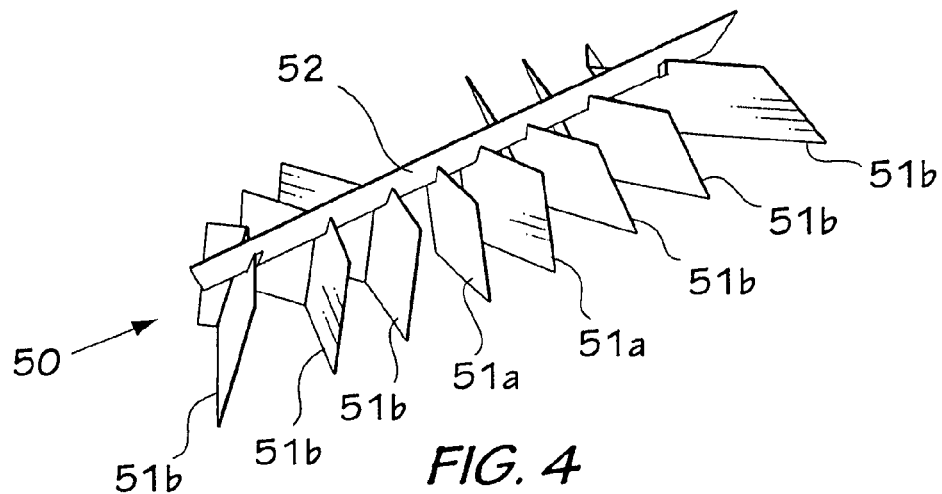
FIG. 4 is an isometric view of a distributor used in the tray assembly of FIG. 1.
Figure 5:
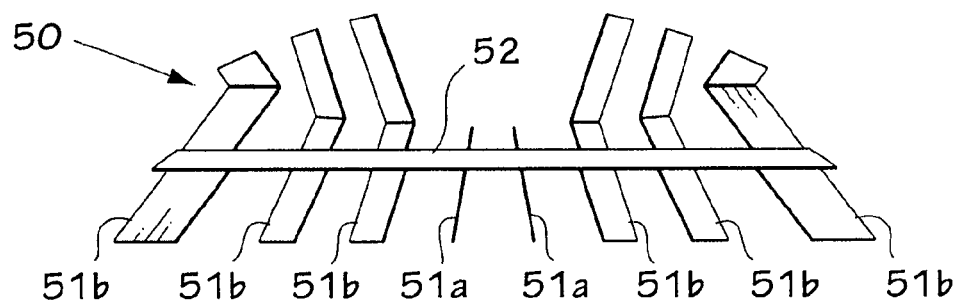
FIG. 5 is a top view of the distributor of FIG. 4.
Figure 6:
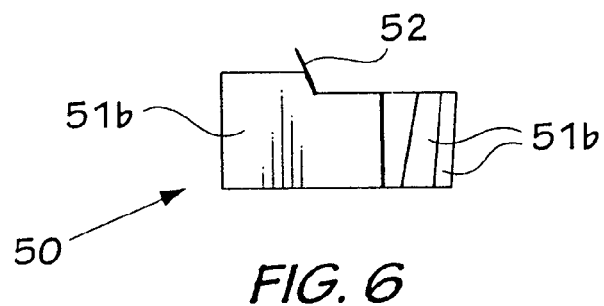
FIG. 6 is an end view of the distributor of FIG. 5.

A distributor indicated generally at 50 is provided at the bottom of the downcomer. As best seen in FIGS. 4 to 6, the distributor 50 includes a plurality of spaced apart baffles 51a and 51b attached to a frame member 52 for directing fluid flow substantially evenly across the fluid receiving area of a deck immediately below. Two central baffles 51a extend vertically. The outer baffles 51b extend at various angles to the vertical. The angles and sizes of baffles 51a and 51b are designed to provide even liquid distribution for different tray dimensions as well as at different liquid and gas flow rates.

Preferably, the baffles 51a and 51b are of certain dimensions i.e. a height of at least 50 to 80% of the distance between the downcomer floor 40 and the tray 30 immediately below. Their length is preferably 30 to 70% of the floor width.

The mixer 50 is used to optimize the mass transfer efficiency needed for enhanced liquid mixing in the downcomer. The mixer design achieves a relatively uniform liquid concentration in the downcomer without affecting its capacity.

In operation, either a feed or reflux liquid is supplied to the distillation tower 12 in a downcomer 14 above a first tray deck 30 and flows across the deck in the form of froth towards an outlet edge spaced apart from the tower wall and over an outlet weir 32 into a downcomer. The liquid-vapor mix flows over the weir 32 and downwardly through the baffles 35 toward and then through openings in the downcomer floor. The lower distributor 50 directs the liquid flow to the inlet portion of a subjacent tray deck. Separated effluent vapors are directed upwardly through the tower 12 and collected above the tray decks 30, and liquid is collected below the tray decks 30. The backpressure from the rising vapors allows liquid/froth to flow across the decks 30 to the next downcomer 14, rather than weeping through perforations in the deck.

It has been found through experiment that the illustrated embodiment provides a more even flow across the tray deck 30 than prior art gas-liquid contactors as demonstrated with reference to FIGS. 7A and 7B. The tests involved the injection of a dye into the liquid at the inlet 31 of the downcomer, and examining the pattern of flow over the area of a subjacent tray at intervals after injection of the dye. FIGS. 7A and 7B illustrate the results of a pilot plant test with air-water in a 1.3 m diameter column. FIG. 7A shows the results of a test using a conventional tray assembly. FIG. 7B illustrates the test results including the tray assembly of FIGS. 1 and 2. During the tests using the apparatus of the present invention it is seen that substantially even flow is observed over a time sequence of 10, 35, 70 and 120 seconds. Moreover, no stagnant liquid pools or retrograde flow in the tray bubbling area was observed.

It has been established experimentally that the advantages of the present invention are provided over a wide range of flow rates of both vapor and liquid, which is not the case for other liquid distribution control means such as baffles or deflectors arrayed across an upper surface of a tray as described in the prior art.

Thus the long sought goal of high tray efficiency due to more uniform liquid concentration in the downcomer and more evenly distributed liquid flow across all of deck 30 of tray assembly 10 is achieved through incorporation of a mixer in the top of the downcomer and a distributor at the bottom of the downcomer 40 above the inlet distribution area of the subjacent deck 30. The incorporation of both the mixer and the distributor in the downcomer provides substantial advantages for use in gas-liquid contact towers when compared with prior art tray designs.

It will be recognized that the structure described above may be used to design trays for different types of towers.

The tray design allows for a relatively high capacity and efficiency, in which the distribution of volumetric liquid flow across the tray deck is essentially similar for all paths along which that liquid flows. Some of the benefits that may be achieved using the tray assembly include no stagnant regions on the tray decks, and no areas in which there is back-flow, thus enabling efficient and effective utilization of the entire area of the tray deck for mass transfer.

In this document, the word "comprising" is used in its non-limiting sense to mean that items following the word are included, but items not specifically mentioned are not excluded. A reference to an element by the singular indefinite article "a" does not exclude the possibility that more than one of the element is present, unless the context clearly requires that there be one and only one such element.

The invention claimed is:

1. A tray assembly for gas/liquid contact in a chemical process tower having a wall to which the tray assembly can be affixed, the tray assembly comprising a perforated tray deck having an inlet distribution area, a downstream area, and an outlet edge downstream of the inlet distribution area spaced apart from the tower wall when installed in the tower, wherein the inlet distribution area is at a higher level than the downstream area to promote fluid flow across the deck towards the outer edge; a downcomer for transporting liquid/vapor mixtures between adjacent vertically spaced apart tray decks, the downcomer including an inlet, an inclined downcomer wall spaced apart from the tower wall; an outlet for discharging liquid/vapor mixtures from the tray deck to an inlet distribution area of an immediately subjacent tray deck when installed in the tower, the downcomer wall extending from the outlet edge downwardly and outwardly toward the tower wall, the downcomer wall having side edges connected to the tower wall, a perforated floor extending from a bottom edge of the downcomer wall to the tower wall; a mixer in the top end of the downcomer including a plurality of spaced apart mixing plates located centrally at the top, inlet end of the downcomer, the plates being parallel to each other and including alternating ridges and grooves extending downwardly and outwardly away from the center of the mixing plates for directing fluid flow downwardly and outwardly toward the tower wall, thereby mixing the fluid without creating a hydraulic pressure gradient therein; and a distributor including a frame member connected to a bottom end of the downcomer wall on a side of said downcomer wall opposite said perforated floor, and a plurality of spaced apart, vertical baffles extending downwardly from said frame member and a bottom surface of the perforated floor for directing the flow of the liquid/vapor substantially evenly beneath the downcomer across the inlet distribution area of said immediately subjacent tray deck.

2. A tray assembly according to claim 1, including an outlet weir on the outlet edge of the tray deck for providing a liquid depth above the tray deck.

3. A tray assembly according to claim 2, wherein the inlet distribution area includes froth formation means, and wherein the inlet distribution area and the downstream area are perforated to permit upward gas flow.

4. A tray assembly according to claim 1, wherein the ridges and grooves are included by angles of 45 degrees to the vertical for effecting mixing in both horizontal and vertical directions.

5. A tray assembly according to claim 4, wherein the mixing plates extend downwardly within the downcomer to about one half the height of the downcomer and occupy 70% of a central planar area of the downcomer.

6. A tray assembly according to claim 1, wherein the mixing plates have a height of at least 50% of the vertical distance between the downcomer floor and the next subjacent tray deck and a length of 30 to 70% of the floor width.

* * * * *